July 18, 1933.  U. L. BARNES  1,918,446
WATER FILTERING APPARATUS
Filed Aug. 24, 1931
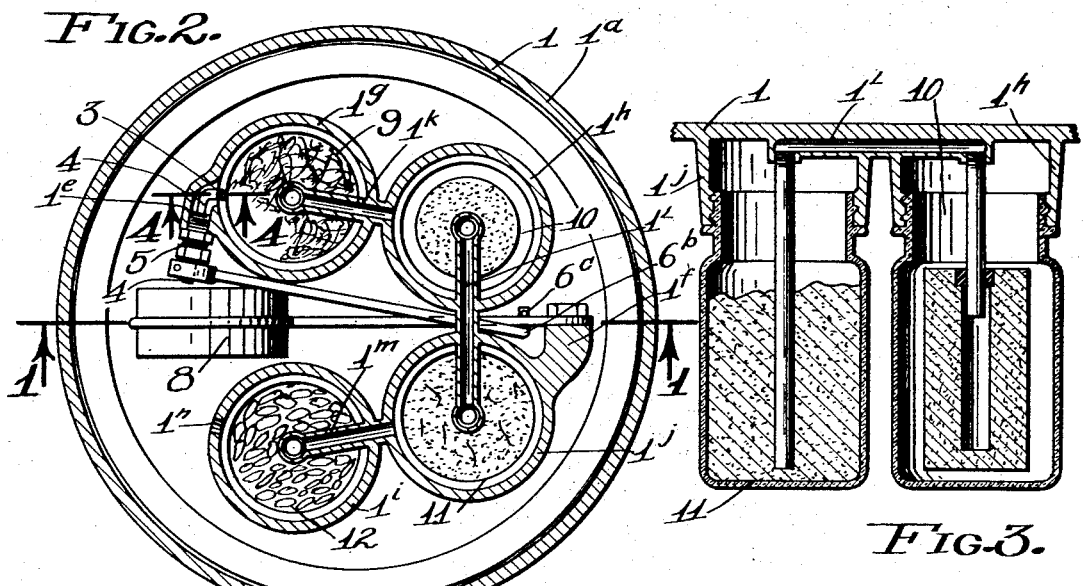
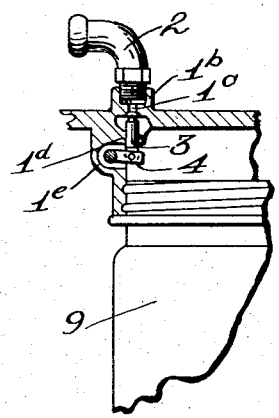
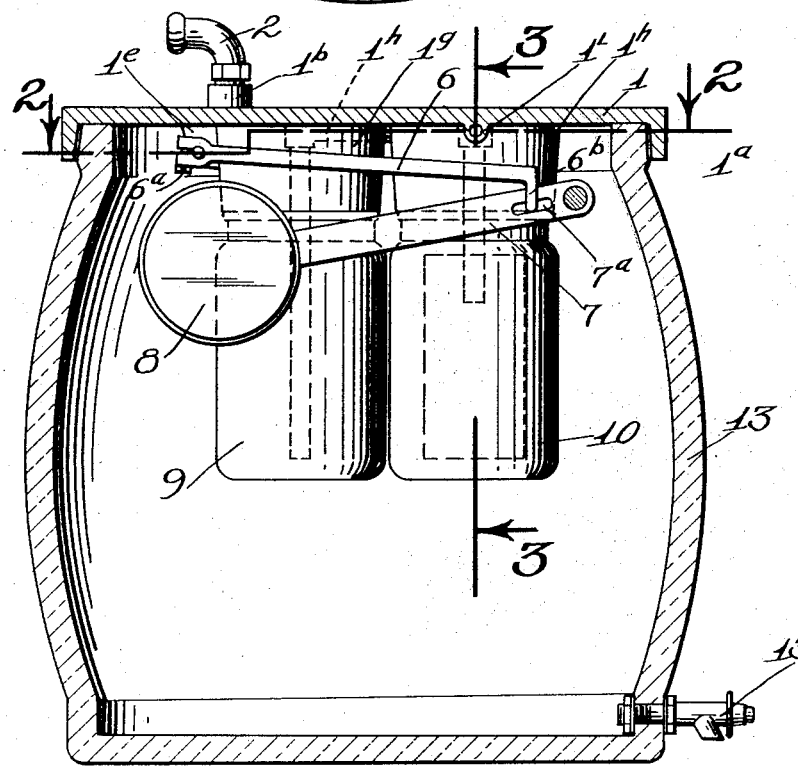
INVENTOR
URIAH L. BARNES
BY
A. B. Bowman
ATTORNEY Patented July 18, 1933

1,918,446

UNITED STATES PATENT OFFICE

URIAH L. BARNES, OF SAN DIEGO, CALIFORNIA

WATER FILTERING APPARATUS

Application filed August 24, 1931. Serial No. 558,979.

My invention relates to a water filtering apparatus, more particularly an apparatus for filtering water through several filtering mediums that may be directly connected with the conventional water service, and the float regulated by the quantity of water used.

The objects of my invention are:

First, to provide a filtering apparatus of this class in which the filtering medium may be easily changed or renewed.

Second, to provide a filtering apparatus of this class in which the filtering mediums may be changed or altered or some of them omitted without affecting the general operation of the apparatus.

Third, to provide a filtering apparatus of this class in which the filtering mediums are placed in conventional jars which may be readily and economically replaced or renewed.

Fourth, to provide an apparatus of this class which may be readily positioned on various types, sizes and shapes of ollas or water receptacles for receiving water through said filtering apparatus.

Fifth, to provide a filtering apparatus of this class in which the control of the water is positively effected.

Sixth, to provide a filtering apparatus of this class in which all of the parts of the apparatus may be readily cleansed.

Seventh, to provide a filtering apparatus of this class which is economical of construction, operation and maintenance, efficient in its action and durable.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a vertical sectional view of my apparatus on line 1—1 of Fig. 2; Fig. 2 is a sectional view through 2—2 of Fig. 1; Fig. 3 is a fragmentary sectional view through 3—3 of Fig. 1; and Fig. 4 is an enlarged sectional view of the water inlet valve along the line 4—4 of Fig. 2.

Similar characters of reference refer to similar parts and portions throughout the several views of the drawing.

The supporting member 1, water inlet conductor 2, valve member 3, valve operating arm 4, stuffing box 5, connecting arm 6, float lever 7, float member 8, filtering medium containers 9, 10, 11 and 12, and water service receptacle 13 constitute the principal parts and portions of my water filtering apparatus.

The supporting member 1 is preferably made of some non-corrosive material, preferably metal, and is provided with a flange 1a adapted to fit loosely over and around the upper end of the water service receptable 13, which is preferably an olla for keeping the water cool, and which is provided with a service faucet 13a. On the upper surface of the support 1, there is provided a boss 1b which is provided with an opening therethrough adapted to receive the one end of the conductor 2, which in this case is shown as an L. The extended end of this L member 2 may be connected with the conventional water service line or with any water receptacle which will furnish water to said conductor.

The opening in the boss 1b is contracted at 1c as shown best in Fig. 4 of the drawing, and adapted to engage with the lower side of this contracted portion 1c is a valve 3, which is provided with guide member 1d. Connected with the valve 3, is the valve operating arm 4 which is mounted in a special lug 1e on the supporting member 1 and is pivotally supported in a stuffing box 5 as shown best in Fig. 2 of the drawing.

Clamped on the extended end of the arm 4, by means of a bolt 6a, is the connecting arm 6. This connecting arm extends some distance on a slight angle from the horizontal and is provided at its extended end with an angular extension 6b which is provided with a right angle extension 6c, which is mounted in a slot 7a a short distance from the pivotal support of the float lever 7 which is pivotally mounted on a lug 1f on the support 1, shown best in Fig. 2 of the drawing.

This float lever 7 extends some distance and is provided on the extended end with a float 8 which is positioned between the receptacles 9 and 12 and adapted to raise and lower in such position with the raising and lowering of the water in the receptacle 13, which in turn operates the valve 3 through the float lever 7, connecting arm 6 and arm 4, for controlling the flow of water to the filtering apparatus from the service line.

Extending downwardly from the supporting member 1, are a plurality of internally threaded hollow lugs 1g, 1h, 1i, and 1j, which screw threads are preferably made to conform to the threads on the conventional fruit canning jars. The shoulder of the jar is adapted to rest against the lower face of the members 1g, 1h, 1i, and 1j, and if desirable a gasket may be interposed therebetween to form a tight joint. The interiors of the lugs 1g and 1i are connected by a conductor 1k, and the lugs 1h and 1j are connected by a conductor 1k, and the lugs 1i and 1j are connected by a conductor 1n, all formed integrally within the walls of the support 1 as shown.

Mounted centrally in these lugs in the cover 1 are water conductors which extend downwardly into the receptacles 9 to 12 inclusive, and these receptacles are provided with filtering mediums placed in said receptacles and then the receptacles are screwed in position as shown and described.

It is preferred to use asbestos in the receptacle 9, stone in the receptacle 10, sand in the receptacle 11 and charcoal in the receptacle 12. However, it will be noted that these may be used in different relation and the filtering medium may be omitted from some of the receptacles if desired.

The operation is as follows:

The water passes from the conductor 2 through the contracted portion 1c, past the valve 3 into the receptacle 9, then enters a tube extending to near the bottom in the central portion of said receptacle, then through the conductor 1k into the upper end of the receptacle 10. This receptacle 10, as shown, discloses a stone filtering medium, therefore, the water must pass through the stone filtering system into the lower end of a tube extending into the upper end of said stone, then through the conductor 1L down to a tube extending to near the bottom of the receptacle 11, then out through the filtering medium and over the upper end of the receptacle 11 through the conductor 1m through a tube mounted centrally in said receptacle and extending to near the bottom of the receptacle 12, then out through the filtering medium and through an opening 1n into the service receptacle 13, thus passing through all the filtering mediums; it being noted that if any of the filtering mediums are omitted, the water passes through the receptacles without the filtering medium therein.

Though I have shown and described a particular construction, combination and arrangement of parts and portions, I do not wish to be limited to this particular construction, combination and arrangement, but desire to include in the scope of my invention, the construction, combination and arrangement as set forth in the appended claims.

Having thus described my invention, what I claim as new and desire to secure by Letters Patent is:

1. In a water filtering apparatus, a water service receptacle, a cover therefor forming a support, a plurality of filtering medium receptacles, readily, removably connected to said support, and water conductors arranged to conduct the water consecutively from and through one filtering receptacle to the other.

2. In a water filtering apparatus, a water service receptacle, a cover therefor forming a support, a plurality of filtering medium receptacles, readily, removably connected to said support, water conductors arranged to conduct the water consecutively from and through one filtering receptacle to the other, and float lever and valve means for controlling the flow of water to the first filtering medium receptacle.

3. In a water filtering apparatus, a support, a plurality of filtering medium receptacles, readily removably connected to said support, water conductors arranged to conduct the water consecutively from and through one filtering receptacle to the other, float lever and valve means for controlling the flow of water to the first filtering medium receptacle, and a water service receptacle upon the top of which said support is adapted to form a cover.

4. In an apparatus of the class described, a water service receptacle, a cover therefor, a plurality of readily removable filtering medium receptacles suspended from the lower side of said cover into said service receptacle and means for admitting water consecutively to and through the support receptacles, and into said service receptacle.

5. In an apparatus of the class described, a water service receptacle, a cover therefor, a plurality of readily removable filtering medium receptacles suspended from the lower side of said cover into said service receptacle, means for admitting water consecutively to and through the support receptacles and into said service receptacle, and means for automatically controlling the flow of water depending upon the quantity of water in said service receptacle.

6. In a water filtering apparatus, a water service receptacle, a cover therefor forming a support, a plurality of filtering medium receptacles suspended from said support, and water conductors arranged to conduct the water consecutively from and through one filtering receptacle to the other.

7. In a water filtering apparatus, a water service receptacle, a cover therefor forming a support, a plurality of filtering medium receptacles suspended from said support, water conductors arranged to conduct the water consecutively from and through one filtering receptacle to the other, and float lever and valve means for controlling the flow of water to the first filtering medium receptacle.

8. In a water filtering apparatus, a support, a plurality of filtering medium receptacles suspended from said support, water conductors arranged to conduct the water consecutively from and through one filtering receptacle to the other, float lever and valve means for controlling the flow of water to the first filtering medium receptacle, and a water service receptacle upon the top of which said support is adapted to form a cover.

9. In an apparatus of the class described, a water service receptacle, a cover therefor, a plurality of filtering medium receptacles suspended from the lower side of said cover into said service receptacle, and means for admitting water consecutively to and through the support receptacles, and into said service receptacle.

10. In an apparatus of the class described, a water service receptacle, a cover therefor, a plurality of filtering medium receptacles suspended from the lower side of said cover into said service receptacle, means for admitting water consecutively to and through the support receptacles and into said service receptacle, and means for automatically controlling the flow of water depending upon the quantity of water in said service receptacle.

URIAH L. BARNES.